United States Patent [19]

Mouri et al.

[11] Patent Number: 5,025,059

[45] Date of Patent: Jun. 18, 1991

[54] PNEUMATIC TIRES WITH TREAD COMPRISING A BLEND OF ISOPRENE RUBBER, HIGH-TRANSPOLYBUTADIENE RUBBER AND CARBON BLACK

[75] Inventors: Hiroshi Mouri; Shunji Araki, both of Tokyo, Japan

[73] Assignee: Bridgestone Corporation, Tokyo, Japan

[21] Appl. No.: 482,606

[22] Filed: Feb. 21, 1990

[30] Foreign Application Priority Data

May 23, 1989 [JP] Japan ................................. 1-127748

[51] Int. Cl.$^5$ ........................... C08K 3/04; C08L 7/00; C08L 9/00
[52] U.S. Cl. ................................... 524/495; 524/496; 525/236; 525/237
[58] Field of Search ............... 524/495, 487, 196, 496; 525/236, 237; 152/209

[56] References Cited

PUBLICATIONS

Abstract of Japanese Patent 60-197748, Hatsutori et al., 10/85.
Abstract of Japanese Patent 60-197749, Hatsutori et al., 10/85.
Abstract of Japanese Patent 61-143453, Ikuchi et al., 7/86.

*Primary Examiner*—Allan M. Lieberman
*Attorney, Agent, or Firm*—Sughrue, Mion, Zinn Macpeak & Seas

[57] ABSTRACT

The wear resistance of the pneumatic tire used under a high severity region is improved by using a particular high-trans polybutadiene rubber in a rubber composition for a ground contact part of the tire tread.

2 Claims, No Drawings

PNEUMATIC TIRES WITH TREAD COMPRISING A BLEND OF ISOPRENE RUBBER, HIGH-TRANSPOLYBUTADIENE RUBBER AND CARBON BLACK

BACKGROUND OF THE INVENTION

1. Field of the Invention

This invention relates to tires having an improved wear resistance, and more particularly to a pneumatic tire which considerably improves a wear resistance at a higher severity region by compounding with polybutadiene having a high content of trans bond unit.

2. Related Art Statement

In tires for truck and bus, the wear resistance is considerably improved in accordance with the recent radial formation and also failures such as heat separation and the like are rapidly reduced, so that these tires are used under a high severity region. The term "severity" used herein means a degree of tire service condition, which is dependent upon various factors such as load, speed, temperature, road surface roughness, running state, acceleration distribution in front, back and lateral directions at running state and the like and is subjected to complicated interaction of these factors. As an indication of total severity viewed from rubber properties, there is frequently used a running distance (KPM) per unit groove depth in tread. Since the high severity is not more than 10,000 km/mm in the conventional KPM, as a planning means for rubber compounding applicable to pneumatic tires used under such a condition, there are generally conducted a method of using a blend of natural rubber and cispolybutadiene rubber or styrene-butadiene rubber as a tread rubber, a method of using an increased amount of carbon black having a fine grain size and the like.

As described in Rubber Chemistry and Technology, vol. 44, page 996 (1971), it is known that the wear resistance is considerably improved at the high severity region by using high-cis polybutadiene alone. In this case, the wear resistance in the high-cis polybutadiene is really 2 times or more as compared with that of SBR 1712 as a control. However, when using the high-cis polybutadiene alone or in a great amount, the processability is considerably degraded but also the fracture properties are poor, so that the chipping, rib tear and the like are caused and the braking performance on wet road surface is undesirably damaged. Therefore, it is usually attempted to use an isoprene series high strength polymer in an amount of not less than 25 parts by weight to polybutadiene rubber as a rubber blend as proposed in Japanese Patent Application No. 63-68434.

SUMMARY OF THE INVENTION

It is, therefore, an object of the invention to considerably improve the wear resistance of the tire without accompanying the decrease of gripping force on wet road surface, reduction of processability and the occurrence of chipping, rib tear and other troubles while solving the aforementioned problems in the use of polybutadiene rubber having a high content of trans bond even when using such a polybutadiene rubber alone or in a great amount.

The inventors have made various studies in order to solve the above problems and found that a rubber composition for tread containing high-trans polybutadiene rubber with a particular content of 1,4-trans bond unit is surprisingly effective when the molecular weight and molecular weight distribution of such a polybutadiene rubber are optimized, and as a result the invention has been accomplished.

According to the invention, there is the provision of a pneumatic tire comprising a tire casing, a tread portion covering a crown portion between both shoulders thereof and a sidewall portion covering each side part of the casing, characterized in that a rubber component of a rubber composition constituting a ground contact part of said tread portion consists of 0–25 parts by weight of an isoprene series rubber containing not less than 70% by weight oil isoprene unit and 100–75 parts by weight of a high-trans polybutadiene rubber containing 75–90% by weight of 1,4-trans bond unit and having a weight average molecular weight $\overline{Mw}$ of not less than 250,000 and a molecular weight distribution of $1.2 \leq \overline{Mw}/\overline{Mn} \leq 1.9$.

In the invention, the isoprene series rubber includes natural rubber, isoprene rubber and isoprene copolymer rubber, among which natural rubber is preferable.

DESCRIPTION OF THE PREFERRED EMBODIMENTS

The invention is based on a new fact that the high-trans polybutadiene rubber has a very high extension crystallinity, fracture properties and processability equal to those of natural rubber, and a high wear resistance equal to that of the high-cis polybutadiene when it is within restricted condition ranges.

As a first condition of the high-trans polybutadiene, the content of 1,4-trans bond is within a range of 75–90% by weight. When the 1,4-trans bond content is less than 75% by weight, the extension crystallinity is insufficient and the high fracture properties are not obtained, while when it exceeds 90% by weight, the static crystallization is caused at a use temperature region of tire, and consequently the rubbery elasticity is not indicated and the wear resistance is not largely improved. Therefore, the content of 1,4-trans bond is limited to a range of 75–90% by weight.

As a second condition, the weight average molecular weight $\overline{Mw}$ is not less than 250,000 and the molecular weight distribution $\overline{Mw}/\overline{Mn}$ is within a range of 1.2–1.9. When $\overline{Mw}$ is less than 250,000 or $\overline{Mw}/\overline{Mn}$ exceeds 1.9, the amount of low molecular weight portion becomes large, so that the processability is good but the fracture strength and wear resistance are largely degraded. While, when $\overline{Mw}/\overline{Mn}$ is less than 1.2, the shape stability in the storing is poor, and also the industrial production of the polymer becomes difficult. Therefore, $\overline{Mw}$ and $\overline{Mw}/\overline{Mn}$ are limited to $\overline{Mw} \geq 250,000$ and $1.2 \leq \overline{Mw}/\overline{Mn} \leq 1.9$, respectively.

Surprisingly, it has been found that the, high-trans polybutadiene rubbers having a strength equal to that of natural rubber, an excellent wear resistance and a good processability can be obtained when adopting the above restricted ranges as the conditions of the polymer.

As a catalyst system for the production of the high-trans polybutadiene rubber used in the invention, mention may be made of the following catalyst systems:

(1) a catalyst system consisting of an alcoholate of barium, strontium or calcium, an organoaluminum compound and an organomagnesium compound as disclosed in Japanese Patent Application Publication No. 62-35401;

(2) a catalyst system consisting of barium alcoholate and an organolithium as disclosed in Japanese Patent Application Publication No. 62-21002 or No. 56-45401;

(3) a catalyst system consisting of a composite complex of barium, strontium or calcium with an organolithium and Lewis base or lithium alcoholate or lithium phenolate as disclosed in Japanese Patent Application Publication No. 60-2323 or Japanese Patent laid open No. 56-157409;

(4) a catalyst system consisting of alcoholate or phenolate of organolithium or barium/organoaluminum/lithium salt of diethylene glycol monoalkyl ether or lithium salt of 2-N-dialkylamino ethanol as disclosed in Japanese Patent Application Publication No. 57-34843;

(5) a catalyst system consisting of organolithium/alcoholate or phenolate or carboxylic acid salt of barium/organoaluminum or organozinc as disclosed in Japanese Patent Application Publication No. 52-30543 or Japanese Patent laid open No. 56-157411 or No. 56-157410;

(6) a catalyst system consisting of alcoholate or phenolate of barium, organolithium, organomagnesium and organoaluminum as disclosed in Japanese Patent laid open No. 56-11296 or Japanese Patent Application Publication No. 60-26406;

(7) a catalyst system consisting of barium alcoholate and organomagnesium as disclosed in Japanese Patent Application Publication No. 52-48910 or Japanese Patent laid open No. 50-123628;

(8) a catalyst system consisting of an organobarium compound, an organoaluminum compound and an alkali metal salt of ethylene glycol dialkyl ether or ethylene glycol monoallyl ether;

(9) a catalyst system consisting of an organolithium compound, barium alkyl phenolate, an alkoxy or phenoxy silicon compound and an alkali metal salt of ethylene glycol monoallyl ether;

(10) a catalyst system consisting of an organolithium compound, barium alkyl phenolate, an alkoxy or phenoxy aluminum compound and an alkali metal salt of ethylene glycol monoallyl ether;

(11) a catalyst system consisting mainly of an organomagnesium compound and/or an organoalkali metal compound, an organoalkaline metal compound (excluding the organomagnesium compound) and an organoaluminum compound (Japanese Patent Application No. 62-253875);

(12) a catalyst system consisting mainly of an organobarium.aluminum compound (ate complex) and a lithium compound (Japanese Patent Application No. 63-43570);

(13) a catalyst system consisting mainly of a barium compound, an organoaluminum compound, an organomagnesium compound and an organolithium alkoxide compound and/or an organolithium amide compound (Japanese Patent Application No. 63-60210).

Moreover, the above catalyst system may be used together with an ether compound such as tetrahydrofuran, ethylene glycol, ethylene glycol dialkyl ester, ethylene glycol diallyl ether, an alkali metal salt of ethylene glycol monoalkyl ether, an alkali metal salt of ethylene glycol monoallyl ether, an alkali metal salt of dialkyl-amino ethanol or the like.

And also, in the preparation of the above catalyst, a conjugated diene may be used, if necessary.

As the conjugated diene to be used in the preparation of the catalyst system, use may be made of isoprene, 1,3-butadiene, 1,3-pentadiene and the like. The above conjugated diene and ether compound are not essential as a catalyst component, but when they are used together with the catalyst system, the catalytic activity of the catalyst component can be more enhanced.

In the preparation of the catalyst, the above catalyst system is first dissolved, for example, in an inert organic solvent and reacted with the conjugated diene or the ether compound, if necessary. In this case, the addition order of the components may be optional. From a viewpoint of the enhancement of polymerization activity and the shortening of polymerization initiating period, it is preferable to previously mix, react and age these catalyst components. In the polymerization, each of these catalyst components may directly and successively be added into the solvent and monomers.

In case of using the above catalyst systems, the resulting trans polybutadiene is greater in the trans bond chain, so that extension crystallinity is favorably developed.

Since the catalyst system used in the production of the high-trans polybutadiene is a living catalyst, the terminal of the polymer can be modified by adding a proper amount of tin halide or the like at the last polymerization stage as disclosed in Japanese Patent laid open No. 58-162601, whereby the microcarbon dispersibility in the polymer can be improved, which is advantageous in the establishment between wear resistance and processability.

In the latter case, however, the polymer is coupled by using a polyfunctional modifier such as tin tetrachloride, so that the molecular weight distribution becomes bimodal, and consequently $\overline{Mw}/\overline{Mn}$ no longer makes sense. Therefore, in the case of a coupling polymer, $\overline{Mw}/\overline{Mn}$ before calculated before coupling, coupling is required to be within a range of 1.2-1.9.

As the polymerization solvent, use may be made of inert organic solvents, an example of which includes aromatic hydrocarbons such as benzene, toluene, xylene and the like; aliphatic hydrocarbons such as n-pentane, n-hexane, n-butane and the like; alicyclic hydrocarbons such as methylcyclopentane, cyclohexane and the like; and a mixture of these solvents.

The polymerization temperature is usually $-20°$ C.$-+150°$ C., preferably $30°-120°$ C.

Moreover, the amount of monomer in the solvent is usually 5-50% by weight, preferably 10-35% by weight.

In the production of polymers, it should be considered that in order to prevent the deactivation of the catalyst system used in the invention and the polymer, the incorporation of a deactivation acting compound such as oxygen, water or carbon dioxide gas into the polymerization system should be prevented as far as possible.

The polymerization reaction may be carried out by a batch system or a continuous system. However, in order to narrow the molecular weight distribution, the batch system is favorable rather than the continuous system.

After the completion of the polymerization, butadiene series polymers can be obtained by blowing steam into the polymer solution to remove the solvent or by adding a poor solvent such as methanol or the like to solidify the polymer and then drying the polymer on a hot roll or under a reduced pressure.

Furthermore, the butadiene series polymer can be obtained by directly removing the solvent from the polymer solution under a reduced pressure.

According to the invention, the reason why the amounts of isoprene series rubber having not less than 70% by weight of isoprene unit and high-trans polybutadiene rubber are limited to ranges of 0–25 parts by weight and 100–75 parts by weight, respectively, is due to the fact that when the amount of the high-trans polybutadiene rubber is less than 75 parts by weight, wear resistance rapidly decreases.

As a carbon black used in the rubber composition according to the invention, use may be made of HAF, ISAF and SAF grades. Particularly, since the invention aims at the improvement of wear resistance, it is favorable that carbon black having a specific surface area of nitrogen adsorption ($N_2SA$) of 110–160 $m^2/g$ and a compressed DBPA oil absorption of 80–130 ml/100 g is used in an amount of 40–80 parts by weight per 100 parts by weight of rubber component. When the amount of carbon black is less than 40 parts by weight, the reinforcing effect is insufficient and the improvement of wear resistance is small, while when it exceeds 80 parts by weight, the wear resistance is improved, but the processability is considerably degraded and also the low heat build-up (resilience) is poor.

In the rubber composition according to the invention, additives usually used in rubber industry, e.g. a softening agent such as aromatic oil, spindle oil or the like, an antioxidant, a vulcanization accelerator, an accelerator activator such as stearic acid, zinc white or the like, a vulcanizing agent and so on may be compounded in usual amounts in addition to the above carbon black.

The following examples are given in illustration of the invention and ar not intended as limitations thereof.

In these examples, various measurements were carried out as follows:

Microstructure of polybutadiene: according to an infrared absorption spectrum method (Molero method)

Molecular weight distribution of polybutadiene: measured by means of GPC HLC802A made by Toyo Soda Kogyo K.K.

Compressed DBP oil absorption of carbon black (24M4 DBPA): according to ASTM D3493-84

Specific surface area of nitrogen adsorption of carbon black ($N_2SA$): according to ASTM D3037-84

Iodine adsorption of carbon black (IA): according to ASTM D1510-81

Mooney viscosity: measured at a temperature of 100° C. for 4 minutes after the preheating for 1 minute (according to JI K6300)

Rubber processability: according to JIS K6300, provided that the measuring temperature was 130° C.

Tensile properties: according to JIS K6301

Resilience: measured at a temperature of 25° C. by means of a Dunlop tripsometer (BS903)

Wear resistance: A tread portion was divided into two parts, one of which parts being made from a rubber composition according to Comparative Example 1 and the other part being made from a test rubber composition. After a test tire comprising such a tread portion was run over a distance of 20,000 km, the remaining groove depth of each part was measured. The wear resistance was represented by an index on the basis that Comparative Example 1 was 100. The larger the numerical value, the better the wear resistance.

Resistance to uneven wear: The worn state of the tire used on the measurement of wear resistance was visually observed from outside and then the worn degree was represented by an index. The smaller the numerical value, the better the resistance to uneven wear.

Braking performance on wet road surface (wet skid): When the vehicle was run on a wetted asphalt road surface at a speed of 40 km/hr, 70 km/hr or 100 km/hr, the rapid braking was given from the respective speed to measure the running distance till the complete stop of the vehicle. The wet skid was represented by an index on the basis that Comparative Example 1 was 100. The larger the numeral value, the better the property.

EXAMPLE 1-5, COMPARATIVE EXAMPLES 1-7

The materials used were shown below.

The name and properties of polybutadiene (BR) used are shown in the following Table 1.

TABLE 1

| Kind of BR | Microstructure (%)[*1] | | | Molecular weight and molecular weight distribution[*2] | |
|---|---|---|---|---|---|
| | cis | trans | vinyl | Mw | Mw/Mn |
| trans BR1 | 22 | 68 | 6 | 353,000 | 1.7 |
| trans BR2 | 14 | 82 | 4 | 348,000 | 1.5 |
| trans BR3 | 5 | 92 | 3 | 325,000 | 1.6 |
| trans BR4 | 12 | 80 | 5 | 240,000 | 1.6 |
| trans BR5 | 15 | 81 | 4 | 340,000 | 2.1 |
| cis BR[*3] | 95 | 3 | 2 | 425,000 | 4.2 |

[*1]measured by an infrared spectrophotometer
[*2]measured by GPC HLC802A made by Toyo Soda Kogyo K.K.
[*3]JSR BR01

The name and properties of carbon black used are shown in the following Table 2.

TABLE 2

| | IA mg/g | $N_2SA$ $m^2/g$ | DBP $cm^3/100$ g | 24M4 DBP $cm^3/100$ g |
|---|---|---|---|---|
| N110 | 145 | 143 | 113 | 88 |
| N219 | 118 | 116 | 78 | 75 |
| N339 | 90 | 96 | 120 | 101 |
| N220 | 121 | 119 | 114 | 100 |

The rubber composition was prepared according to a compounding recipe as shown in the following Table 3.

TABLE 3

| Compounding component | part by weight |
|---|---|
| Starting rubber | 100 |
| Carbon black | variable |
| Aromatic oil | 5 |
| Stearic acid | 2 |
| Santoflex 13[*1] | 1 |
| ZnO | 5 |
| Vulcanization accelerator[*2] | 1.5 |
| Sulfur | 1.0 |

[*1]antioxidant
[*2]N-cyclohexyl-2-benzothiazole sulfenamide

A test specimen was prepared by curing the rubber composition of Table 3 at 145° C. for 40 minutes. Furthermore, this rubber composition was used for tread to form a test tire having a tire size of TBR11R22.5 16PR. The various tests were made with respect to the resulting test tire.

The results are shown in the following Table 4.

TABLE 4

| Comparative Example | Example | Example | Example | Comparative Example | Comparative Example |
|---|---|---|---|---|---|

TABLE 4-continued

|  | 1 | 1 | 2 | 3 | 2 | 3 |
|---|---|---|---|---|---|---|
| Starting rubber |  |  |  |  |  |  |
| natural rubber | 50 | — | 20 | 20 | 20 | 20 |
| trans BR1 | — | — | — | — | — | 80 |
| trans BR2 | — | 100 | 80 | 80 | — | — |
| trans BR3 | — | — | — | — | — | — |
| trans BR4 | — | — | — | — | — | — |
| trans BR5 | — | — | — | — | — | — |
| cis BR | 50 | — | — | — | 80 | — |
| Carbon black |  |  |  |  |  |  |
| N110 | 50 | 50 | 50 | — | 50 | 50 |
| N219 | — | — | — | — | — | — |
| N339 | — | — | — | — | — | — |
| N220 | — | — | — | 50 | — | — |
| $ML_{1+4}$ | 82 | 76 | 79 | 74 | 126 | 79 |
| 300% tensile stress (kg/cm$^2$) | 137 | 130 | 131 | 135 | 126 | 125 |
| Tensile strength (kg/cm$^2$) | 281 | 280 | 274 | 268 | 196 | 228 |
| Elongation (%) | 491 | 505 | 489 | 451 | 365 | 421 |
| Resilience (%) | 54 | 52 | 53 | 55 | 56 | 50 |
| Wear resistance (index) | 100 | 168 | 141 | 135 | 119 | 105 |
| Resistance to uneven wear (index) | 3 | 2 | 3 | 3 | 6 | 4 |
| Wet skid (index) | 100 | 107 | 102 | 100 | 87 | 97 |

|  | Comparative Example 4 | Comparative Example 5 | Comparative Example 6 | Example 4 | Example 5 | Comparative Example 7 |
|---|---|---|---|---|---|---|
| Starting rubber |  |  |  |  |  |  |
| natural rubber | 20 | 20 | 20 | 20 | 20 | 35 |
| trans BR1 | — | — | — | — | — | — |
| trans BR2 | — | — | — | 80 | 80 | 65 |
| trans BR3 | 80 | — | — | — | — | — |
| trans BR4 | — | 80 | — | — | — | — |
| trans BR5 | — | — | 80 | — | — | — |
| cis BR | — | — | — | — | — | — |
| Carbon black |  |  |  |  |  |  |
| N110 | 50 | 50 | 50 | — | — | — |
| N219 | — | — | — | 50 | — | — |
| N339 | — | — | — | — | 50 | — |
| N220 | — | — | — | — | — | 50 |
| $ML_{1+4}$ | 72 | 71 | 73 | 74 | 74 | 81 |
| 300% tensile stress (kg/cm$^2$) | 220 | 118 | 120 | 118 | 139 | 135 |
| Tensile strength (kg/cm$^2$) | 222 | 226 | 238 | 264 | 264 | 268 |
| Elongation (%) | 302 | 434 | 441 | 483 | 450 | 471 |
| Resilience (%) | 41 | 50 | 51 | 52 | 54 | 53 |
| Wear resistance (index) | 101 | 118 | 114 | 125 | 121 | 114 |
| Resistance to uneven wear (index) | 8 | 4 | 4 | 3 | 3 | 3 |
| Wet skid (index) | 101 | 101 | 100 | 100 | 98 | 97 |

As shown in Examples 1–5, when the polymer containing about 82% of 1,4-trans bond is used in a great amount or alone, the wear resistance is considerably improved with holding high strength at rapture and processability as seen from the comparison with Comparative Examples 1 and 2. In Comparative Example 2, the wear resistance is considerably improved, but the fracture properties are low and there is a fear of causing failures such as chipping, rib tear and the like. The limitation on content of 1,4-trans bond and molecular weight distribution in the high-trans polybutadiene rubber are induced from Comparative Examples 3–6.

REFERENCE EXAMPLE 1

Production of polybutadiene containing 68% of trans bond content (trans BR1)

Into a polymerization reaction vessel of 7 l capacity made from stainless steel and provided with a stirrer were charged 2400 g of cyclohexane and 600 g of 1,3-butadiene in a nitrogen gas atmosphere, which were adjusted to 65° C. Then, an ate complex obtained by reacting 1.7 mmol of barium dinonylphenoxide with 6.8 mmol of triethyl aluminum at 70° C. for 30 minutes, and a dark yellowish red and transparent solution obtained by reacting 8.5 mmol of 1,3-butadiene, 7.0 mmol of n-butyllithium and 3.4 mmol of tetrahydrofulfryloxy lithium at 80° C. for 30 minutes were charged into the reaction vessel to start polymerization.

The polymerization was carried out for 40 minutes while raising temperature, and further for 30 minutes when the temperature reached 100° C.

The conversion ratio of the charged monomer into polymer was 95%. To the thus obtained polymer solution was added 5 g of 2,6-di-t-butyl-p-cresol as a stabilizing agent, which was subjected to a steam stripping to remove solvents and dried on a roll at 110° C. to obtain a polymer.

The polymer had a content of 1,4-trans bond in butadiene portion of 68%, a content of vinyl bond of 6% and a Mooney viscosity of 51.

The properties of the polymer are shown in Table 1.

REFERENCE EXAMPLE 2

Production of polybutadiene containing 82% of trans bond content (trans BR2)

Into a polymerization reaction vessel of 7 l capacity made from stainless steel and provided with a stirrer were charged 2400 g of cyclohexane and 600 g of 1,3-butadiene in a nitrogen gas atmosphere, which were adjusted to 65° C. Then, an ate complex obtained by reacting 1.7 mmol of barium dinonylphenoxide with 6.8 mmol of triethyl aluminum at 70° C. for 30 minutes, and a dark yellowish red and transparent solution obtained by reacting 17 mmol of 1,3-butadiene, 5.1 mmol of n-butyllithium and 5.1 mmol of tetrahydrofulfryloxy lithium at 60° C. for 30 minutes were charged into the reaction vessel to start polymerization.

The polymerization was carried out for 40 minutes while raising temperature, and further for 20 minutes when the temperature reached 95° C.

The conversion ratio of the charged monomer into polymer was 96%. To the thus obtained polymer solution was added 5 g of 2,6-di t-butyl-p-cresol as a stabilizing agent, which was subjected to a steam stripping to remove solvents and dried on a roll at 110° C. to obtain a polymer.

The polymer had a content of 1,4-trans bond in butadiene portion of 82%, a content of vinyl bond of 4% and a Mooney viscosity of 47.

The properties of the polymer are shown in Table 1.

REFERENCE EXAMPLE 3

Production of polybutadiene containing 92% of trans bond content (trans BR3)

The polymerization was carried out by the same method as in Reference Example 2 except that dibutyl magnesium was used instead of n-butyllithium as a catalyst.

The properties of the polymer are shown in Table 1.

REFERENCE EXAMPLE 4

Production of polybutadiene containing 80% of trans bond content (trans BR4)

The polymerization was carried out by the same method as in Reference Example 2 except that 5.3 mmol of n-butyllithium as a catalyst and 4.7 mmol of tetrahydrofulfryloxy lithium were used.

The properties of the polymer are shown in Table 1.

REFERENCE EXAMPLE 5

Production of polybutadiene containing 81% of trans bond content (trans BR5)

The polymerization was carried out by the same method as in Reference Example 2 except that 5.1 mmol of n-butyllithium as a catalyst and 5.1 mmol of tetrahydrofulfryloxy lithium were used and ⅔ of the catalyst solution was added to start the polymerization and the remaining ⅓ catalyst solution was added after 15 minutes.

The properties of the polymer are shown in Table 1.

As mentioned above, according to the invention, the rubber composition containing the high-trans polybutadiene rubber of the above restricted condition ranges is used in a ground contact part of a tire tread portion, whereby there can be obtained pneumatic tires having an improved wear resistance without damaging the processability and fracture properties.

What is claimed is:

1. A pneumatic tire comprising a tire casing, a thread portion covering a crown portion between both shoulders thereof and a sidewall portion covering each side part of the casing, characterized in that a rubber component of a rubber composition constituting a ground contact part of said thread portion consists of 0–25 parts by weight of an isoprene series rubber containing not less than 70% by weight of isoprene units and 100–75 parts by weight of a high-trans polybutadiene rubber containing 75–90% by weight of 1,4-trans bond units and having a weight average molecular weight Mw of not less than 250,000 and a molecular weight distribution of $1.2 \leq Mw/Mn \leq 1.9$, and said rubber composition contains 40–80 parts by weight of carbon black having a specific surface area of nitrogen adsorption of 110–160 $m^2/g$ and a compressed DBP oil absorption of 80–130 ml/100 per parts by weight of said rubber component.

2. The pneumatic tire according to claim 1, wherein said isoprene series rubber is selected from natural rubber, isoprene rubber and isoprene copolymer rubber.

* * * * *